Sept. 21, 1954 C. P. BALDWIN 2,689,719
MINING APPARATUS WITH LONGITUDINALLY SWIVELED HEAD
Filed Dec. 20, 1946 8 Sheets-Sheet 4

Inventor:
Clyde P. Baldwin.
By Charles F. Osgood.
atty.

Sept. 21, 1954        C. P. BALDWIN        2,689,719
MINING APPARATUS WITH LONGITUDINALLY SWIVELED HEAD
Filed Dec. 20, 1946                                                                    8 Sheets-Sheet 6

Inventor:
Clyde P. Baldwin.
by Charles F. Osgood.
atty.

Sept. 21, 1954  C. P. BALDWIN  2,689,719
MINING APPARATUS WITH LONGITUDINALLY SWIVELED HEAD
Filed Dec. 20, 1946  8 Sheets-Sheet 7

Sept. 21, 1954  C. P. BALDWIN  2,689,719
MINING APPARATUS WITH LONGITUDINALLY SWIVELED HEAD
Filed Dec. 20, 1946  8 Sheets-Sheet 8

Inventor:
Clyde P. Baldwin.
by Charles F. Osgood,
atty.

Patented Sept. 21, 1954

2,689,719

UNITED STATES PATENT OFFICE 2,689,719

MINING APPARATUS WITH LONGITUDINALLY SWIVELED HEAD

Clyde P. Baldwin, Claremont, N. H., assignor to Joy Manufacturing Company, a corporation of Pennsylvania Application December 20, 1946, Serial No. 717,398

4 Claims. (Cl. 262—28)

This invention relates to mining apparatus and more particularly, but not exclusively, to improvements in a coal mining apparatus of the horizontal kerf cutting, low vein, mounted track cutter type adapted to operate while supported and guided by a mine trackway.

An object of the present invention is to provide an improved mining apparatus. Another object is to provide an improved coal mining apparatus of the horizontal kerf cutting, mounted type having improved kerf cutting means for cutting horizontal, or substantially horizontal, kerfs at or near the level of the mine floor. A further object is to provide an improved coal mining apparatus having an improved adjustable supporting structure for the kerf cutter and improved kerf cutter driving means associated with the supporting structure in a novel manner. Yet another object is to provide an improved coal mining apparatus of the truck mounted, track supported and guided type. A still further object is to provide an improved coal mining apparatus of the mounted type whereby, due to its improved design, extreme vertical compactness is attained. Still another object is to provide an improved coal mining apparatus especially adapted to low vein work in underground coal mines having low head room. A still further object is to provide an improved coal mining apparatus having improved hydraulically operated means for effecting the various adjustments and movements thereof whereby improved flexibility of operation is attained. Yet another object is to provide an improved coal mining apparatus having improved adjustable supporting and moving means of the hydraulically operated and controlled type for adjusting and moving the kerf cutter in an improved manner. A further object is to provide an improved hydraulically operated and controlled adjusting, swinging and tilting means for the kerf cutter of a mining apparatus of the character referred to. Still another object is to provide improved driving means for the kerf cutter associated with a cutter adjusting and tilting means whereby the kerf cutter may be driven in an improved manner irrespective of the adjusted or tilted position of the kerf cutter. A further object is to provide an improved hydraulically driven propelling means for a coal mining apparatus. Still another object is to provide an improved coal mining apparatus of the electrically driven type having an improved reeling mechanism for the power conductor cable for the driving motors.

Yet another object is to provide an improved coal mining apparatus having novel combinations and arrangements of parts. These and other objects and advantages of the invention will, however, hereinafter more fully appear.

In the accompanying drawings, there is shown for purposes of illustration one form which the invention may assume in practice.

In these drawings.

In this illustrative embodiment of the invention, there is shown a coal mining apparatus of the horizontal kerf cutting, mounted track cutter type supported and guided by a mine trackway, although it will be evident that various features of the invention may be incorporated in mining apparatus of various other types, and that the apparatus may be mounted in a known manner on traction devices adapted to move over the mine floor without the aid of a guiding trackway.

The improved coal mining apparatus disclosed herein generally comprises a self-propelled portable base, herein designated 1 and in the form of a truck mounted on wheels 2 adapted to travel along a trackway 3 laid on a mine floor. Supported on the truck midway between the sides thereof and longitudinally between the front and rear wheel axes is a horizontal turntable 4, in turn supporting an elongated swingable arm structure or boom generally designated 5 of an improved design, overhanging the forward end of the truck and which carries at its outer extremity a horizontal kerf cutter generally designated 6. Supported on the turntable is a horizontal motor 7 for driving the kerf cutter, and supported transversely on the rearward overhanging portion of the truck rearwardly of the turntable is a horizontal motor 8 for driving a pumping means 9 for providing a source of liquid under pressure for the various hydraulically operated devices of the apparatus. Arranged on the truck frame longitudinally between the turntable and the motor 8 is a valve mechanism, generally designated 10, for controlling liquid flow relative to the various hydraulically operated devices, while located at the rear end of the truck rearwardly of the motor 8 is a reeling mechanism generally designated 11 for the power conductor for supplying power medium to the motors 7 and 8. A hydraulically operated propulsion mechanism, generally designated 12, is provided for driving the truck wheels to propel the apparatus.

Figure 8:
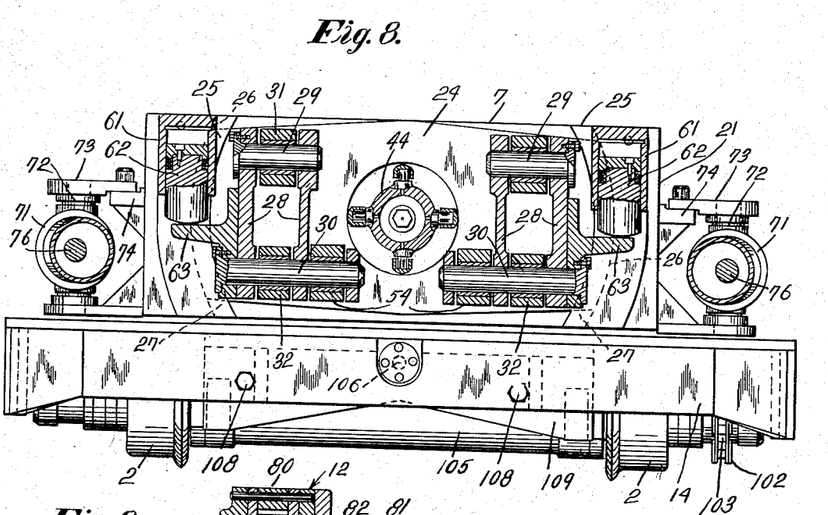
Fig. 8 is an enlarged cross-sectional view taken substantially on line 8—8 of Fig. 1.

The truck 1 comprises a truck frame 14 of an extremely low compact design and the turntable 4 is mounted in a relatively low position between the truck wheels and has a depending circular bearing support 15 journaled for rotation about a vertical axis within bearing sleeves 16, 16 supported by a circular bearing support 17 integral with the truck frame. The turntable axis, as shown in Fig. 4, is located somewhat nearer the rear wheels than to the front wheels. The circular bearing portion 15 of the turntable extends downwardly below a horizontal plane including the wheel axes and has attached thereto by screws a bottom plate 18 which engages the lower bearing sleeve for retaining the turntable in position in its bearing mounting on the truck frame. The motor 7 is herein preferably an electric motor and is permanently arranged horizontally at the top of the turntable with the axis of the motor power shaft 19 extending radially with respect to the axial line of the turntable. This motor herein preferably has its rear end located rearwardly of the turntable axis with its forward portion projecting horizontally in advance of the turntable, and has its casing 20 preferably formed integral with the turntable as shown in Fig. 4. A transverse vertically disposed member in the form of a front motor head or rigid front support 21 is secured to the forward end of the motor casing 20 and carries a circular bearing support 22 coaxial with the motor power shaft and supporting a bearing sleeve 23 on which a tilting support or rear arm frame 24 is mounted, and the support 24 is held in position on its bearing by guide brackets 25, 25, bolted to the side portions of the front motor head 21. These brackets 25 have arcuate guideways 26 receiving lateral arcuate guides 27 integral with the tiltable support 24 at the opposite sides thereof. The means for tilting the support 24 will be later described. The tiltable support has near its opposite sides forwardly projecting ears 28 supporting pairs of aligned pivot pins 29, 29 and 30, 30 arranged, as shown in Fig. 8, at the top and bottom of the tiltable support 24 with the aligned axes of the upper pair of pins parallel to the aligned axes of the lower pair of pins. These pivot pins provide widely spaced pivotal points, thus affording extremely rugged and stable pivotal mounting structure for an upper arm 31 and parallel lower arms 32, 32 of the arm or boom structure 5. The upper arm 31 is relatively wide and of a rugged design and extends across the top of the arm structure in the manner shown. The lower arms 32, 32 are arranged in widely spaced relation near the sides of the tiltable support 24 to provide a space therebetween for the arm swinging means as later described. The forward ends of the arms 31, 32 are pivotally connected, on parallel axes spaced apart equally to the rear pivotal axes, to pairs of aligned pivot pins 33, 33 and 34, 34 similar to the pivot pins 29 and 30 and similarly carried by projecting ears, the latter being integral with a tiltable supporting frame or cutter head 35 which carries the kerf cutter. Thus a parallel motion support is provided for the cutter head frame 35, so that irrespective of the position of the arms about their pivots, the kerf cutter may be maintained in a horizontal position. The cutter head frame 35 has a circular bearing support 36 supporting bearing sleeves 37 on which is swivelled a circular bearing portion 38 integral with a hanger frame 39 by which the kerf cutter is carried. The cutter head frame 35 has a projecting arcuate guide 40 (Fig. 3) which is received in a guideway 41 on the hanger frame to provide an additional supporting bearing or guide for the hanger frame. The kerf cutter comprises an elongated plane cutter bar 42 mounted on the hanger frame 39 and having an endless cutter chain 43 guided for circulation about its margin.

Figure 3:
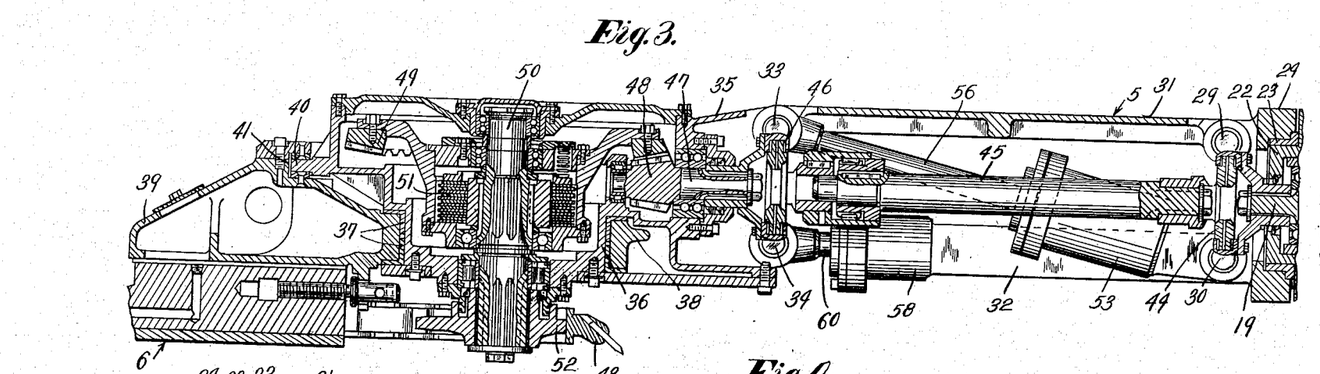
Fig. 3 is an enlarged view in central longitudinal vertical section, taken substantially on line 3—3 of Fig. 1.
Figure 4:
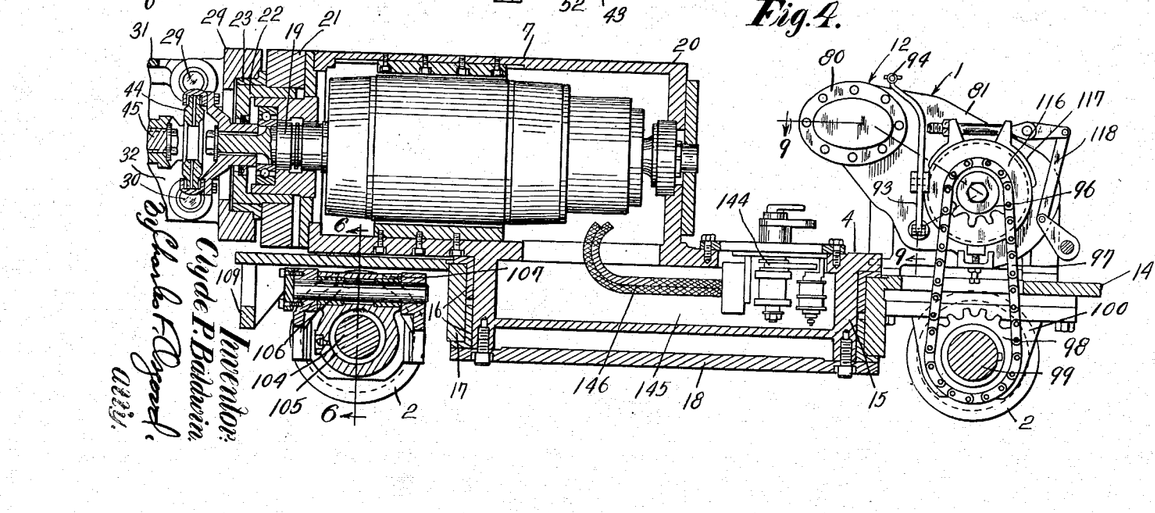
Fig. 4 is an enlarged central longitudinal vertical sectional view taken substantially on lines 4—4 of Fig. 1.

Now referring to the cutter chain drive, it will be noted that keyed to the front end of the motor power shaft 19 is an element of a flexible coupling or universal joint 44 located near the rear pivots of the parallel motion arms, and this coupling has an element keyed to a transmission shaft 45, herein extending longitudinally between the arms as clearly shown in Fig. 3. Splined for limited sliding movement to the forward end of the shaft 45 is an element of flexible coupling or universal joint 46 located near the front arm pivots. The transverse centers of the couplings 44 and 46 are located vertically midway between the pivot points of the arms substantially in vertical planes including the arm pivot axes. Any slight relative axial motion between the couplings during drive thereof is compensated for by the splined connection between the front coupling and the transmission shaft. The forward coupling 46 has an element keyed to a horizontal shaft 47 suitably journaled within the head frame 35 and has formed thereon a bevel pinion 48 meshing with a large bevel gear 49 enclosed within the head frame and suitably journaled on a vertical shaft 50 herein arranged coaxial with the cutter bar pivot. This bevel gear has its hub connected by a multiple disk "safety" overload clutch 51 set at a predetermined load so as to slip automatically upon overload to permit relative rotation between the gear and shaft. Keyed to the lower end of the vertical shaft 50 is a chain sprocket 52 which engages and drives the cutter chain 43 of the kerf cutter. By this arrangement, the kerf cutter may swing horizontally about the axis of the vertical shaft 50 and the cutter chain may be driven by the chain sprocket 52 through the shaft and universal joint connections irrespective of the angular adjusted positions of the arms and cutter bar about their respective pivots.

The means for vertically swinging the parallel motion arms 31, 32 comprises a pair of double acting hydraulic cylinders 53, 53 arranged in parallel relation between the lower arms 32 and beneath the upper arm 31, and these cylinders are pivotally mounted at their rear ends at 54 on the elongated pivot pins 30 of the lower arms, as shown in Fig. 8. Reciprocable in these cylinders are pistons 55 having their piston rods 56 extending forwardly outwardly through the front cylinder heads and pivotally connected at 57 to the elongated upper front pivot pins 33 similar to the rear pins 30 shown in Fig. 8, at the forward end of the upper arm 31. The pistons 55 in the cylinders 53 may move under the influence of liquid under pressure in the cylinders to swing the parallel motion arms either upwardly or downwardly about their pivotal axes to move the cutter bar into different parallel horizontal cutting planes. By trapping liquid in the cylinders 53, the arm structure may be locked in adjusted position.

The cutter frame 35 is tiltable in a vertical direction about the axes of the upper front pivot pins 33, and to accomplish such tilting, the lower arms 32 have double acting cylinders 58 integral with their rearward portions and containing reciprocable pistons 59 having their piston rods 60 providing the forward arm portions extending forwardly through the front cylinder heads. Thus the lower arms 32 are extensible and the pistons 59 may move under the influence of liquid under pressure in the cylinders 58 to extend the arms to move the latter out of parallelism to tilt the cutter head frame upwardly about a transverse axis to vary the longitudinal inclination of the cutter bar of the kerf cutter. By trapping liquid in the cylinders 58, the head frame may be locked in its adjusted position.

The means for rocking the tiltable rear support 24 comprises inverted single acting vertical cylinders 61 (see Fig. 8) integral with the guide brackets 25 at the opposite sides of the support 21 and containing pistons 62 engaging at their lower ends lateral lugs 63 integral with the tiltable support 24. The pistons 62 may move under the influence of liquid under pressure in the upper ends of the cylinders 61 to tilt the rear support 24, together with the arm structure and cutter head supported thereby, about an axis aligned with the motor shaft axis to change the lateral inclination of the cutter bar of the kerf cutter. By trapping liquid in the cylinders 61, the tiltable support may be locked in adjusted position.

The swinging means for the cutter bar hanger 39 comprises horizontal double acting cylinders 64, 64 pivotally mounted on upright axes at 65 on lateral projections 66 integral with the opposite sides of the cutter head frame 35. Reciprocable in these cylinders are pistons 67 having their piston rods 68 extending forwardly through the front cylinder heads and pivotally connected at 69 to laterally projecting ears 70 integral with the opposite sides of the bar hanger frame 39. The pistons 67 may move under the influence of liquid under pressure in the cylinders 64 to swing the bar hanger frame 39 in one direction or the other about its pivotal axis on the cutter head frame 35 to swing the cutter bar of the kerf cutter horizontally in its plane. By trapping liquid in the cylinders 64, the cutter bar may be locked against pivotal movement relative to the head frame 35.

Figure 5:
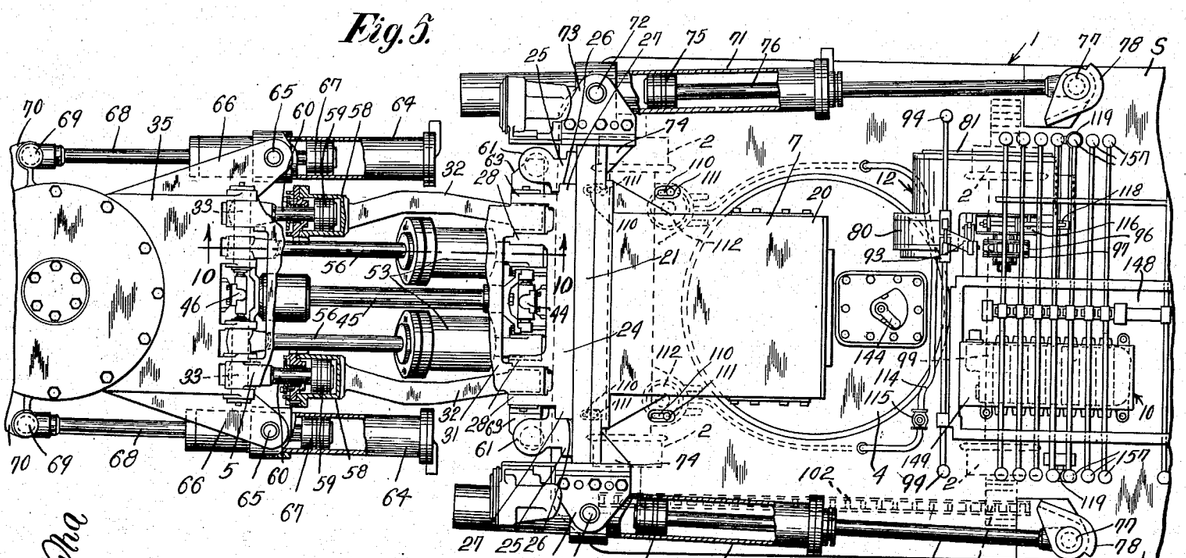
Fig. 5 is a fragmentary plan view on an enlarged scale, with parts in section, illustrating structural details.

Now referring to the means for rotating the turntable 4 about its axis to swing the cutter supporting arm structure horizontally relative to the truck, it will be noted that a pair of horizontally swingable, double acting cylinders 71, 71 are pivotally mounted on vertical axes at 72 a substantial distance in advance and at the sides of the turntable axis, on lateral ears 73 secured to brackets 74 integral with the laterally projecting portions or projecting sides of the rigid front head or arm support 21. Contained in these cylinders are pistons 75 having piston rods 76 extending rearwardly through the rear cylinder heads and pivotally connected at their rear ends at 77 to brackets 78 rigidly secured to the sides of the truck frame herein at the opposite sides of the valve mechanism 10, as shown in Fig. 5. The cylinders 71 may move under the influence of liquid under pressure therein relative to the pistons 75 to effect turntable rotation in one direction or the other to move the cutter bar of the kerf cutter horizontally through a wide arc about the turntable axis. By trapping liquid in the cylinders 71, the turntable may be locked against rotation with respect to the truck frame.

Figure 1:
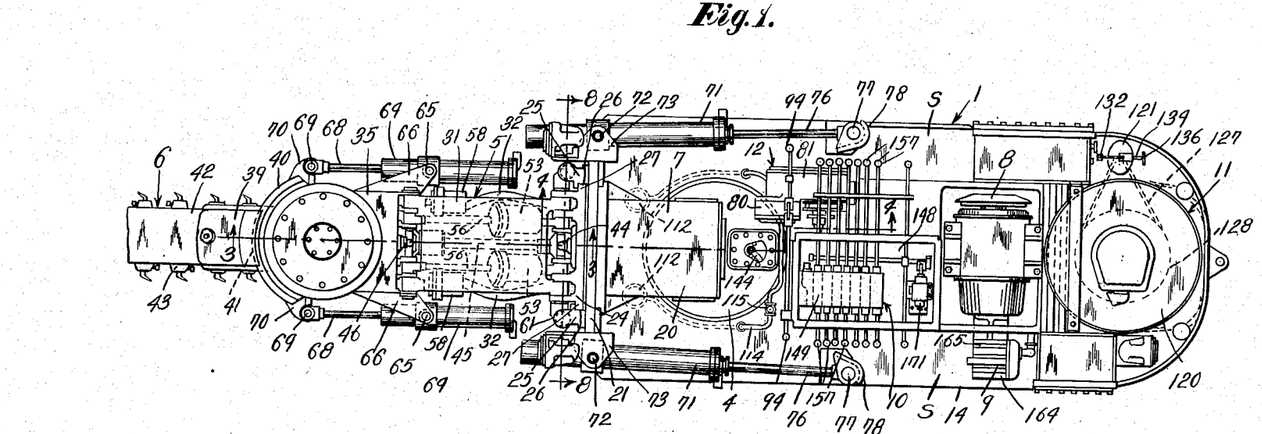
Fig. 1 is a plan view of a coal mining apparatus constructed in accordance with a preferred illustrative embodiment of the invention, with the top cover plates removed.
Figure 6:
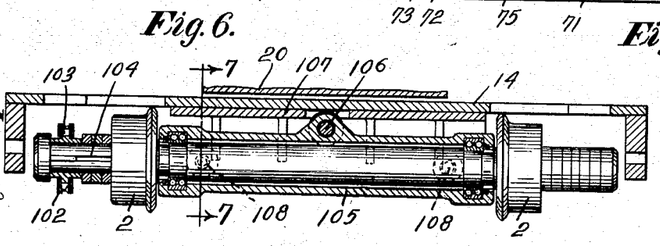
Fig. 6 is a cross-sectional view taken substantially on line 6—6 of Fig. 4.
Figure 7:
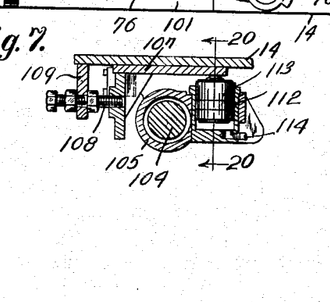
Fig. 7 is a detail vertical sectional view taken on line 7—7 of Fig. 6.
Figures 9, 10:
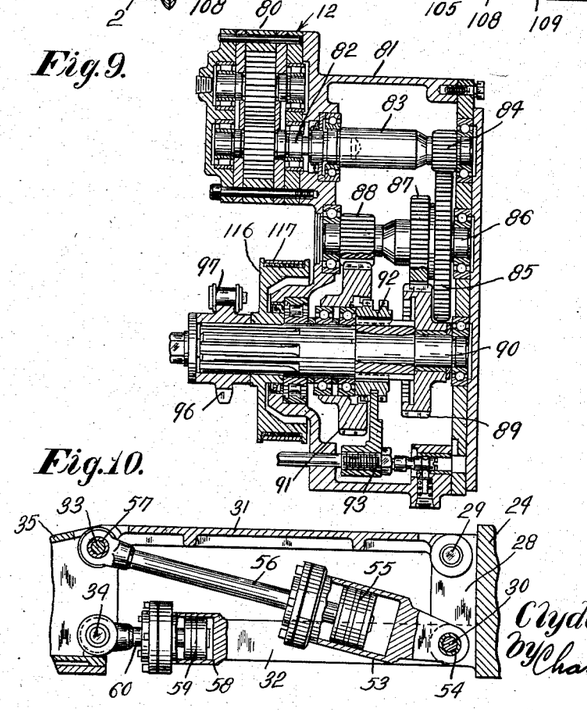
Fig. 9 is a developed sectional view taken substantially on lines 9—9 of Fig. 4.
Fig. 10 is a view in longitudinal vertical section taken substantially on line 10—10 of Fig. 5.
Figure 20:
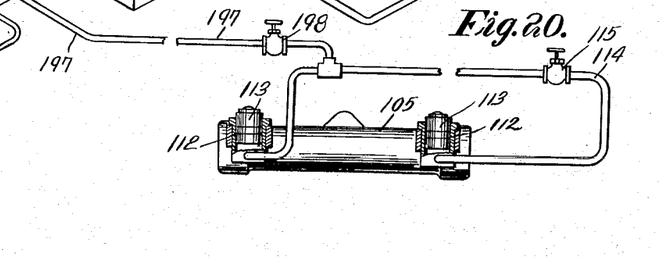
Fig. 20 is a detail cross-sectional view taken substantially on line 20—20 of Fig. 7, with parts omitted.

The improved truck propelling means 12 comprises a conventional reversible hydraulic motor 80 of the intermeshing gear type (see Fig. 9) supported by a gear housing 81 which has a suitable base (Fig. 4) secured to the top of the truck frame. This motor has its power shaft 82 aligned with and coupled to a horizontal shaft 83 which drives a spur pinion 84 meshing with a large spur gear 85 secured to a parallel shaft 86. The shafts 83 and 86 are suitably journaled within the gear housing, and the shaft 86 has secured thereto spur gears 87 and 88 of different size. The gear 87 meshes with a fast speed gear 89 journaled on a horizontal shaft 90, the latter herein arranged parallel with the shafts 83 and 86 and likewise suitably journaled within the gear housing. The gear 88 meshes with a slow speed gear 91 likewise journaled on the shaft 90. The fast and slow speed gears 89 and 91 are alternately connectible to the shaft 90 by a conventional sliding clutch 92 having suitable operating means 93 provided with conveniently located dual handles 94 arranged at opposite sides of the truck frame (see Fig. 5) near the side recesses of the truck frame which provide the operator's stations, herein designated S in Figs. 1 and 5. Thus the shaft 90 may be driven selectively at fast or slow speeds, and keyed to this shaft is a chain sprocket 96 which drives an endless drive chain 97 extending downwardly through an opening in the truck frame (Fig. 4) and connected to a chain sprocket 98 keyed to the rear truck wheel axle 99 which is suitably journaled in axle boxes 100 secured to the truck frame. Also secured to the rear truck wheel axle 99 is a chain sprocket 101 (see Fig. 5) connected by an endless drive chain 102 to a chain sprocket 103 keyed to a front truck wheel axle 104. The axle 104 is suitably journaled in bearings supported within an axle housing 105 which is pivotally mounted at 106 on a frame 107 to rock about a longitudinal axis located centrally between the sides of the truck, as shown in Fig. 6. The frame 107 abuts the plane bottom surface of the truck frame and is guided for longitudinal adjustment relative to the truck frame by means of adjusting screws 108 connected to a forward vertical plate 109 secured to the truck frame, as shown in Fig. 7. The truck frame has longitudinal slots 110 through which bolts 111 on the frame 107 pass, and these bolts may be tightened to clamp the frame firmly in adjusted position. Thus by adjusting the frame 107, the drive chain 102 may be placed under the desired tension. By provision of the pivot 106, the front truck wheel axle is free to rock in a vertical direction relative to the truck frame to facilitate movement of the truck over an uneven trackway. To steady the apparatus during the cutting operation and to reduce the possibility of tipping, the pivoted axle housing 105 may be rigidly locked to the truck frame by means of vertical hydraulic cylinders 112 secured to the axle housing rearwardly of the front axle 104, as shown in Figs. 7 and 20, and containing pistons 113 engaging the bottom of the frame 107. A pipe 114, controlled by a manually operable valve 115, connects the lower ends of the cylinders together. The liquid may be trapped in the cylinders 112 by closing the valve 115 to lock rigidly the parts in position. This rocking axle structure is being claimed in a divisional application Serial No. 192,074, filed October 25, 1950, now matured into Patent No. 2,663,266, granted December 22, 1953.

For braking the truck wheels, there is provided a brake drum 116 (see Fig. 9) keyed to the shaft 90 and with which a contractible brake band 117 cooperates, the latter having suitable operating means 118 including conveniently located dual handles 119 disposed at opposite sides of the truck frame near the operator's stations.

Figure 17:
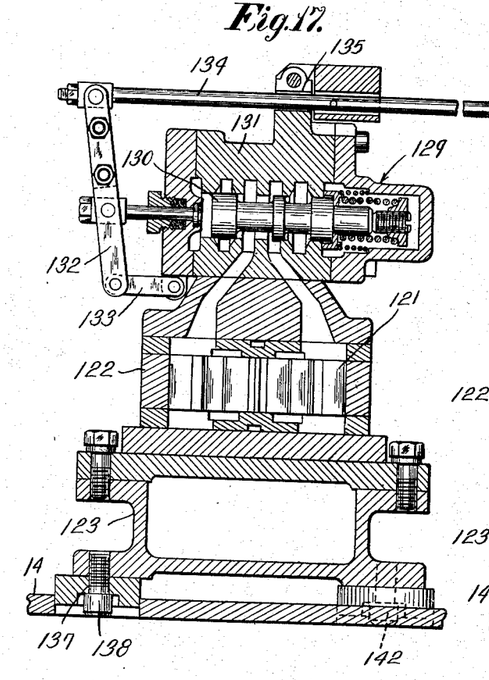
Fig. 17 is a longitudinal extending vertical sectional view taken substantially on lines 17—17 of Fig. 16.
Figure 18:
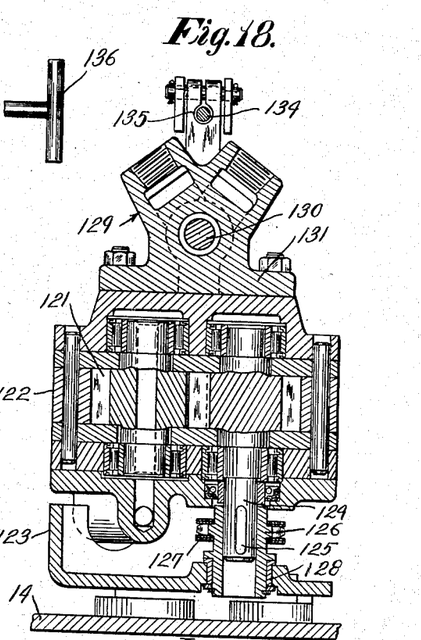
Fig. 18 is a cross-sectional view taken substantially on line 18—18 of Fig. 16.

The reeling mechanism 11 for the power conductor cable for the electric motors 7 and 8 comprises an electric cable reel 120 arranged horizontally at the rear end of the truck frame rearwardly of the motor 8 to revolve on a vertical axis, and wound on this reel is a usual electric power conductor cable. This reel is adapted to be driven in cable winding direction by a conventional hydraulic motor 121 of the intermeshing gear type (see Figs. 17 and 18) having its casing 122 detachably secured to a bottom frame 123 in turn secured to the top of the truck frame. This motor has its vertical power shaft 124 splined or otherwise detachably coupled at 125 within the hub of a chain sprocket 126 which engages and drives an endless drive chain 127 connected to a chain sprocket 128 suitably secured to the cable reel. The sprocket 126 is arranged beneath the motor casing in the space between the latter and the bottom wall of the frame 123 and is journaled at 128 within the bottom wall of the frame, as shown in Fig. 18. When the motor casing 122 is detached from the frame 123, the entire motor unit may be bodily lifted to move the motor shaft out of the sprocket hub while the sprocket 126 remains undisturbed in its bearing mounting.

Figure 16:
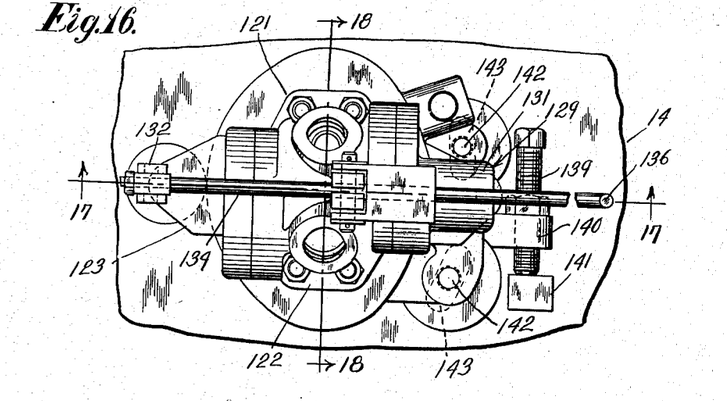
Fig. 16 is an enlarged fragmentary plan view, illustrating the cable reel motor and control valve therefor.

The reel motor 121 is controlled by a valve mechanism, generally designated 129, which may be similar to that disclosed in a copending application to H. H. Vanderzee, Serial No. 571,991, filed January 9, 1945, now matured into Patent No. 2,593,367, granted April 15, 1952. This valve mechanism includes a shiftable control and by-pass valve 130 contained in a housing 131 attached to the top of the motor casing for controlling flow of liquid with respect to the reel motor to control reel rotation or to by-pass liquid through the motor. This valve mechanism does not per se enter into the present invention, and since it is fully described in the Vanderzee application above referred to, further detailed description thereof herein is deemed unnecessary. The control valve is operated by a lever 132 pivotally connected at one end by floating links 133 to the valve housing and pivotally connected at its other end to an operating rod 134 lying across the top of the valve housing and guided on the latter at 135 and provided with an operating handle 136. The cable reel may be driven by the motor 121 in cable winding direction and the conductor cable may be drawn off from the reel with the valve 129 controlling rotation of the reel in cable unwinding direction, all in the manner described in the application mentioned above. The bottom frame 123 which supports the motor is pivoted at 137 on a screw 138 passing through an opening in the truck frame and threadedly secured to the swingable frame. An adjusting screw 139 (see Fig. 16) is threaded within a lug 140 integral with the frame 123 and engages an abutment 141 on the truck frame so that when the screw is adjusted, the frame 123 may be swung horizontally about its pivot to change the distance between the sprocket 126 and the reel sprocket 128 so that the tension of the drive chain 127 may be varied as desired. Screws 142 threaded in the swingable frame 123 pass through elongated slots 143 in the truck frame, and when these screws are tightened, they serve rigidly to clamp the swinging frame in adjusted position. Features of the cable reel mechanism are being claimed in a divisional application Serial No. 191,456, filed October 21, 1950, now matured into Patent No. 2,601,958 granted July 1, 1952.

The cutter chain driving motor 7 is herein a reversible motor and may be reversed so that the cutter chain 43 may be circulated in the reverse direction about the margin of the cutter bar 42, it being understood that the cutters of the cutter chain are reversely positioned on the chain prior to such reverse operation. To effect motor reversal, a manually operable reverse switch 144 of a conventional design is arranged in an improved manner within a chamber 145 within the depending bearing portion 15 of the turntable 4, as shown in Fig. 4. Usual wires 146 lead from this reverse switch and are connected in the motor circuit so that when the switch is moved to reverse position, motor reversal is effected. The chamber 145 is totally enclosed and explosion proof and communicates through an opening in the bottom wall of the motor casing with the motor chamber. The turntable structure embodying the communicating motor and switch mounting chambers is being claimed in a divisional application Serial No. 257,463, filed November 21, 1951.

Figures 11, 12:
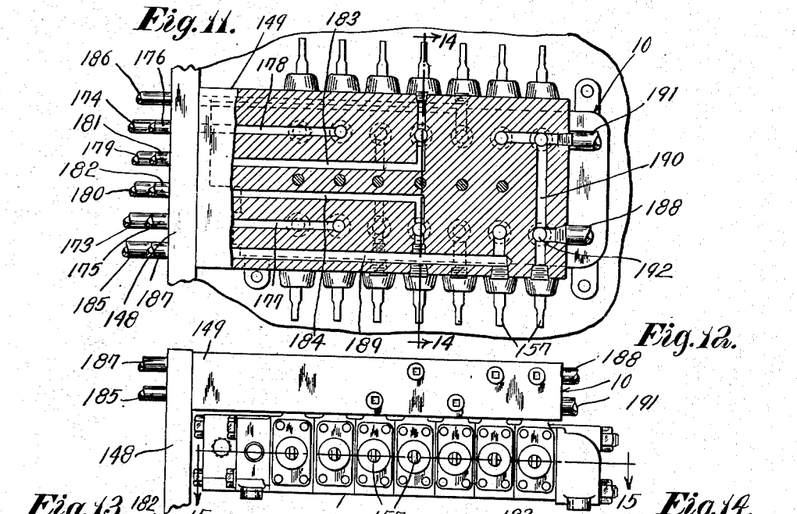
Fig. 11 is a view partially in plan and partially in horizontal section, illustrating the valve box, manifold, and liquid tank.
Figs. 12 and 13 are respectively side and end views of the valve box and manifold.
Figures 13, 14, 15:
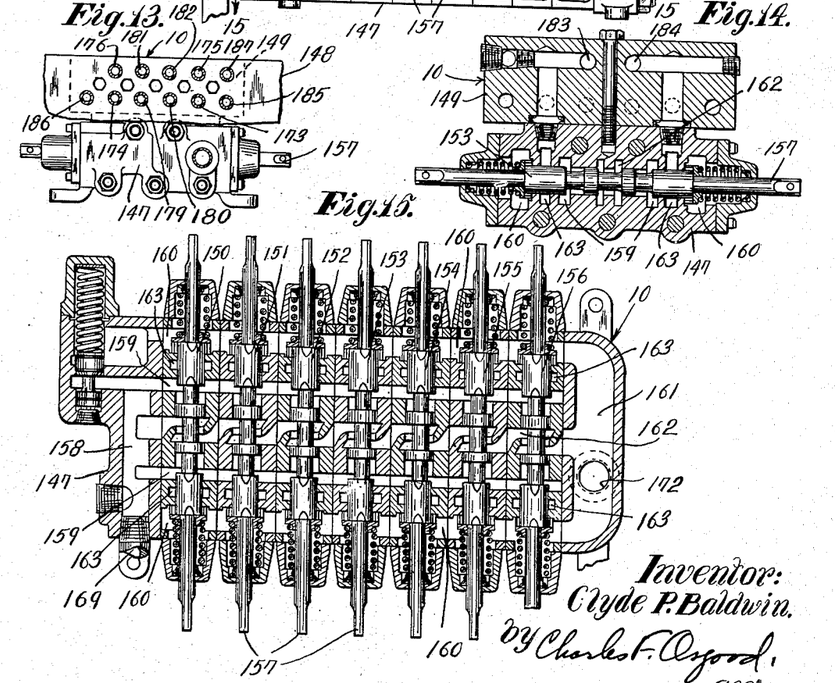
Fig. 14 is an enlarged cross-sectional view taken on line 14—14 of Fig. 11.
Fig. 15 is an enlarged horizontal sectional view taken on line 15—15 of Fig. 12.

The valve mechanism 10 is generally like that disclosed in Patent No. 2,384,447, in which I am a coinventor, but is, however, somewhat modified to suit particular conditions present in the apparatus disclosed herein. This valve mechanism includes a valve box 147 arranged horizontally within a liquid tank 148 formed in the truck frame, and the valve box is attached to the bottom of a horizontal manifold 149 of a low compact design, also arranged within the tank and secured to a wall of the tank (Figs. 11 and 12). The various valve conduits leading from the valve box to the various hydraulically operated devices of the apparatus are connected to the manifold in such manner that the conduits are compactly grouped at the ends of the manifold below the top of the truck frame. The valve box has parallel transverse bores containing balanced, spool type slide valves 150, 151, 152, 153, 154, 155 and 156 respectively each having dual operating handles 157 conveniently located at the opposite sides of the truck near the operator's stations, in a manner similar to those of the patent above referred to. The valve box has an inlet passage 158 at one end with which longitudinal supply passages 159, 159 communicate, and longitudinal discharge passages 160, 160 communicate with an outlet passage 161 at the opposite end of the valve box. Arranged longitudinally between the parallel supply passages is a central bypass passage 162 for connecting the inlet passage with the outlet passage when the valves are in their neutral position, as shown in Fig. 15. Annular grooves 163, 163 in the walls of the valve-receiving bores are arranged longitudinally of the latter between the supply and discharge passages 159 and 160 and are each connectible under the control of the valves with either a supply passage or a discharge passage.

Figure 19:
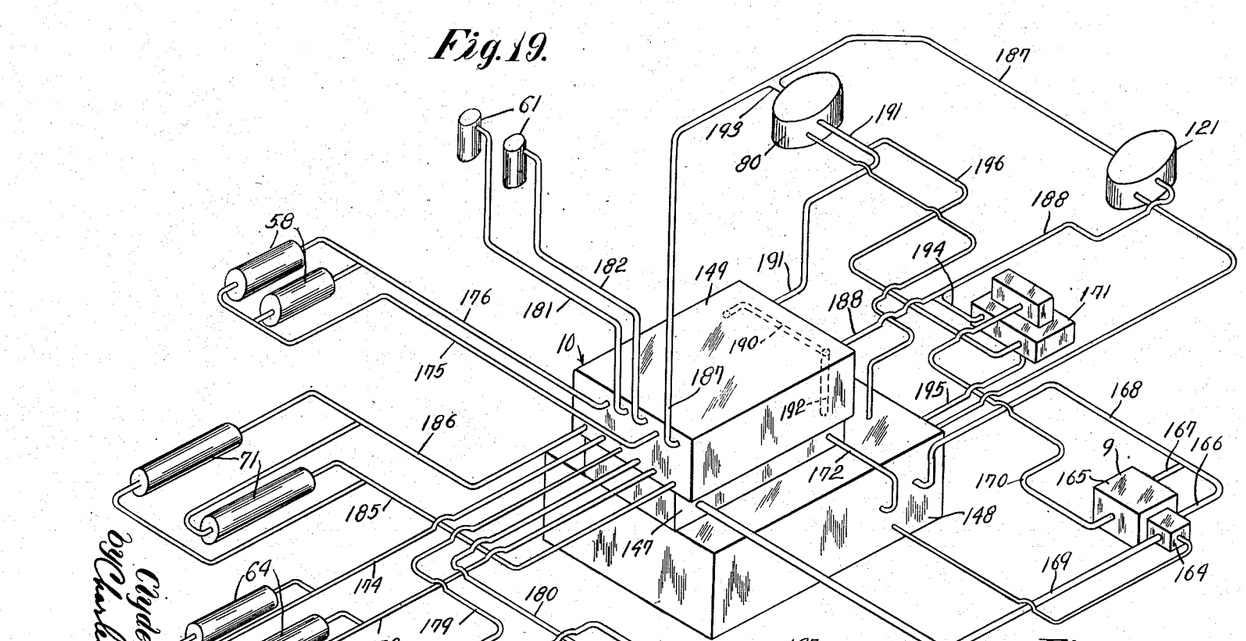
Fig. 19 is a diagrammatic view illustrating the hydraulic system.

The hydraulic system is diagrammatically illustrated in Fig. 19 with the conduits connected to an end of certain of the cylinders to facilitate illustration, but actually the conduits lead to the sides of such ends of the cylinders and the piston rods of the pistons contained in the cylinders project through such ends of the cylinders. Also, the liquid tank 148 is shown in Fig. 19 beneath the valve box for convenience of illustration while actually the valve box and manifold are located within the tank. The valve mechanism 10 is incorporated in the hydraulic system and it will be noted that the pumping means 9 may comprise two separate and distinct pumping units but, in this instance, comprises a unitary dual pumping means having a pump 164 of low capacity discharge and a pump 165 of high capacity discharge, and these pumps have their intakes respectively connected by conduits 166 and 167 to a liquid supply conduit 168 leading to the tank 148. The pump discharges are respectively connected to conduits 169 and 170, the former leading to the inlet passage 158 and the latter leading to a conventional manually controllable four-way valve device 171 herein also shown outside of but actually arranged in the tank 148. The outlet passage 161 is connected by a conduit 172 to the tank 148. Conduits 173 and 174 are connected through suitable passages in the manifold 149 with the grooves 163 of the bore receiving the slide valve 150 and lead to the bar swing cylinders 64, 64 each through branched conduits connected to the opposite ends of the cylinders so that the valve 150 may control bar swing in either direction. Conduits 175 and 176 are connected through suitable passages (as shown at 177 and 178 in Fig. 11) in the manifold 149 to the grooves 163 of the bore receiving the slide valve 151 and lead each through branched conduits to the opposite ends of the bar tilting cylinders 58, 58 so that the valve 151 may control longitudinal bar tilt. Conduits 179 and 180 are connected through suitable manifold-passages to the grooves 163 of the bore receiving the slide valve 152 and each lead through branched conduits to the opposite ends of the arm-lift cylinders 53, 53 so that the valve 152 may control tilt of the arms either upwardly or downwardly. Conduits 181 and 182 are connected through suitable passages (as shown at 183 and 184 in Figs. 11 and 14) in the manifold to the grooves 163 of the bore receiving the slide valve 153 and lead to the upper ends of the arm tilt cylinders 61, 61 so that the valve 153 may control lateral tilt of the cutter bar. Conduits 185 and 186 are connected through suitable manifold passages to the grooves 163 of the bore receiving the slide valve 154 and each lead through branched conduits to the opposite ends of the turntable rotating cylinders 71, 71 so that the valve 154 may control turntable rotation to effect bar swing in either direction about the turntable axis. Conduits 187 and 188 are connected through suitable manifold passages (shown at 189 and 190 in Fig. 11) to the grooves 163 of the bore receiving the slide valve 155 and lead to the opposite sides of the reel motor 121 so that the valve 155 may control reel rotation independently of movement of the apparatus along the mine trackway. A conduit 191 is connected to the groove 163 at the upper end, as viewed in Fig. 15, of the bore receiving the slide valve 156 and leads to one side of the propelling motor 80. A passage 192 in the manifold 149 connects the groove 163 at the lower end, as viewed in Fig. 15, of the bore receiving the slide valve 156 and leads through the conduit 188, past the reel motor 121 and through the conduit 187 and a branch conduit 193 to the opposite side of the propelling motor 80. Thus the valve 156 controls the flow of liquid under pressure from the low volume discharge pump 164 to the propelling motor 80 to effect operation thereof in one direction or the other. The four-way valve device 171 may be similar to that described in Patent No. 2,384,447, mentioned above, and is connected by conduit 194 to the conduit 188 leading to the reel motor 121 and through a discharge conduit 195 leading to the tank 148. Liquid under pressure may be supplied through the discharge conduit 170 from the large volume pump unit 165 through the valve device 171 and conduits 194 and 188 past the reel motor 121 and through conduit 187 and branch conduit 193 to the propelling motor 80, while the discharge side of the propelling motor 80 is connected through a conduit 196 leading from the conduit 191 through the valve device 171 to the discharge conduit 195. When it is desired to drive the propelling motor 80 in the opposite direction, the valve device 171 is shifted so that the liquid discharged from the large volume pump unit may flow through conduit 196 to the propelling motor 80 and through the propelling motor 80 and through conduit 187 to the reel motor 121 to operate the latter to drive the cable reel in cable winding direction, and the discharge side of the reel motor is then connected through conduit 188 and conduit 194 past the valve device 171 and through conduit 195 back to the tank. Under certain conditions, liquid under pressure may be supplied to the propelling motor 80 through the conduit 188 under the control of the slide valve 156 and through the conduit 194 under the control of the valve device 171 so that the relatively large volume of liquid displaced from both pumps may be conducted to the propelling motor to effect high speed drive. A conduit 197 (Figs. 19 and 20) leads from one of the branch conduits of conduit 179 to the conduit 114 so that liquid may be supplied to the cylinders 112 from the hydraulic system under the control of a hand valve 198. The valve 198 is normally closed and is opened only to replenish the liquid in the cylinders 112.

Figure 2:
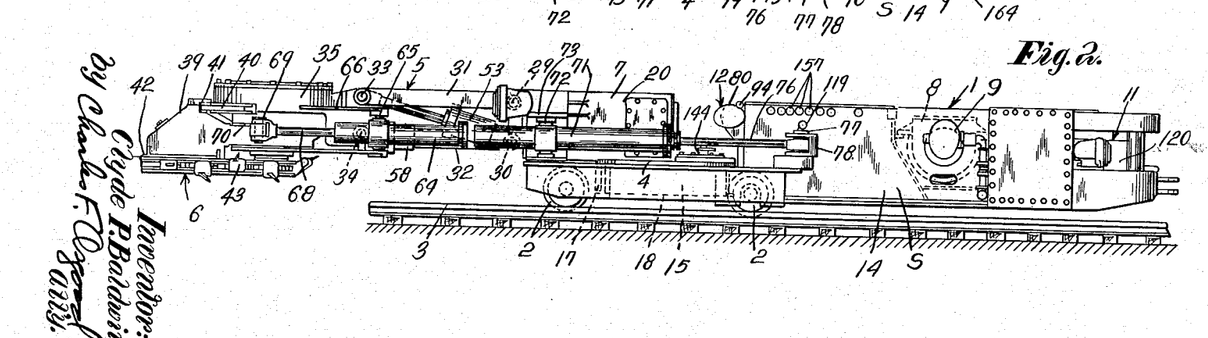
Fig. 2 is a side elevational view of the mining apparatus shown in Fig. 1.
Figure 21:
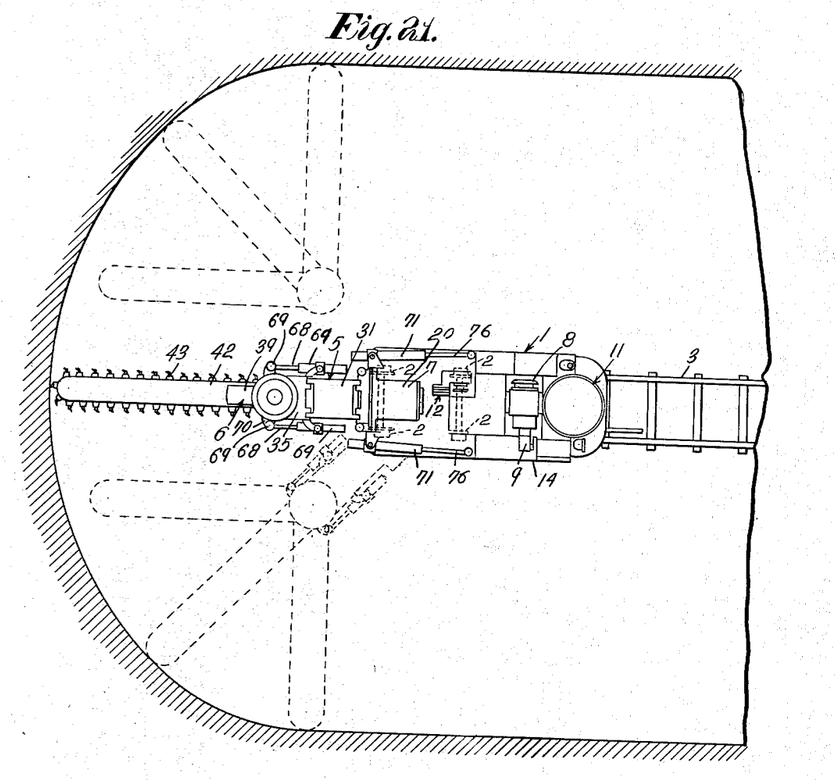
Fig. 21 is a diagrammatic plan view showing the mining apparatus in operating position in a mine.
Figure 22:
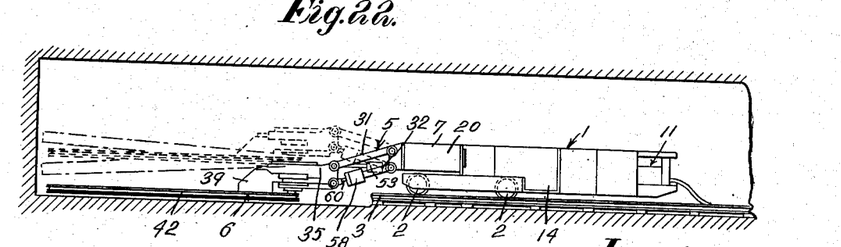
Fig. 22 is a diagrammatic side view of the mining apparatus shown in Fig. 21.

The general mode of operation of the improved coal mining apparatus is as follows: The apparatus may be propelled along the mine trackway from one working place to another at a relatively high transport speed by the truck propelling motor 80 through the high speed gearing 87, 89 under the control of the valve device 171, or may be propelled at a relatively low speed under the control of the valve device 171 through low speed gears 88, 91. If higher speed propulsion of the apparatus is desired, liquid displaced from both pump units is supplied to the propelling motor 80 under the control of the slide valve 156 and the valve device 171. By regulating the valve device 171, the speed of the propelling motor 80 may be varied. During traveling about the mine, the valve 115 is open so that the front wheel axle may tilt freely on its pivot. When the working place is reached and it is desired to cut a horizontal kerf at the level of the mine floor outside and below the level of the mine trackway in accordance with the arcwall method of cutting, the operator closes the valve 115 to lock the front axle and then may operate the slide valve 154 to supply liquid under pressure from the pump unit 164 to the swinging cylinders 71, 71 to effect swinging of the arm structure 5 horizontally about the turntable axis relative to the truck from the centrally located transport position shown in Figs. 1 and 21 to a position wherein the cutter bar 42 is located at the right hand side of the trackway with its pivot lying outside the trackway. As the arm structure 5 is swung horizontally about the turntable axis relative to the truck frame, liquid under pressure may be supplied to the bar swinging cylinders 64, 64 under the control of the slide valve 150 to effect swinging of the cutter bar 42 about its pivot in the opposite direction until the tip end of the cutter bar assumes a position at the right hand rib. Liquid under pressure may then be supplied to the cylinders 53 under the control of the slide valve 152 to swing the arm or boom structure 5 downwardly, and as the bar is moved downwardly, it may be concurrently tilted relative to the arm structure upon liquid supply to the tilting cylinders 58, 58 under the control of the slide valve 151 so that the cutter bar may be moved into a horizontal cutting position at the floor level. When the cutter bar is so positioned to cut a horizontal kerf at the level of the mine floor, the operator may effect liquid supply under the control of the slide valve 156 to the propelling motor 80 to drive the truck wheels through the low speed gearing 88, 91 to effect movement of the apparatus at a relatively low speed along the mine trackway to sump the cutter bar beneath the coal. Upon completion of the sumping cut, the low speed clutch 92 is released and the truck wheel brake 116, 117 applied to hold the apparatus in a stationary position on the mine trackway. The operator may then move the slide valve 155 to supply liquid under pressure to the cylinders 71, 71 to swing the arm or boom structure 5 horizontally about the turntable axis thereby to effect swinging of the kerf cutter from its sumping position at the right hand rib transversely across the coal face to a position wherein the tip end of the cutter bar is in adjacency to the left hand rib. During horizontal swinging of the cutter bar from right to left about the turntable axis, the operator may move the slide valve 150 to supply liquid under pressure to the cylinders 64, 64 thereby to swing the cutter bar about its pivot in the opposite direction to first straighten up the bar and thereafter to move the bar into an opposite angular relation so that upon completion of the transverse swinging cut, the cutter bar is located at the left hand rib with its tip end near the rib and its pivot located outside and below the trackway. The valves 154 and 150 are then moved into their neutral position and the wheel brake is released and the valve 156 is moved into a position to supply liquid under pressure to the propelling motor 80 to drive the truck wheels at a relatively slow speed to propel the apparatus rearwardly along the mine trackway to effect withdrawal of the cutter bar from beneath the coal face. Upon proper adjustment of the valves 150, 151, 152 and 154, the arm structure and cutter bar are then returned to their transport position, as shown in Fig. 2. During the horizontal cutting operation, if it is desired to tilt the cutter bar to change its angle in altitude and to rock the cutter bar edgewise about the longitudinal axis of the arm support, this may be accomplished by supplying liquid under pressure under the control of the valve 151 to the cylinders 58, 58 of the lower parallel arms 32 to change the length of the latter and move the arms 31, 32 out of parallelism, thereby to tilt the cutter support 35 and cutter bar about the axis of the pivotal connection between the upper arm and the cutter support and by supplying liquid under pressure under the control of the valve 151 to the cylinders 61, 61 to tilt the cutter bar edgewise about the longitudinal axis of the arm support. Different tilted and adjusted positions of the cutter bar are indicated in dotted lines in Fig. 22, and the extreme lateral range of adjustment of the arm structure and cutter bar at the opposite sides of the trackway are indicated in dotted lines in Fig. 21. If it is desired to cut horizontal kerfs in the coal seam at different elevations with respect to the mine floor, liquid under pressure may be supplied to the cylinders 53, 53 to swing the arm structure upwardly, and in any elevated position of the cutter bar the latter may be sumped in, swung transversely in its plane across the coal face, and withdrawn from the coal face in the manner fully described above. During adjustment of the cutter bar into different horizontal cutting positions in horizontal planes at different elevations, the parallel motion arm structure 31, 32 acts automatically to maintain the cutter bar in a horizontal position regardless of the angular position of the arm structure about its pivotal mounting on the turntable. By rocking the cutter bar about its transverse and longitudinal axes relative to the turntable during the cutting operation, it is possibel to move the cutter bar to accommodate itself to a rolling bottom or pitching coal seam. Under certain conditions, the tiltable support 24 may be disconnected from the head frame 21 and inverted with respect to the head frame and again attached to the latter so that the cutter bar may be operated to cut a horizontal kerf at the level of the mine roof or horizontal kerfs in horizontal planes at different elevations with respect to the mine roof, and as above described, the cutter bar may be rocked about transverse and longitudinal axes during the over-cutting operation in any adjusted position of the cutter bar.

As a result of this invention, an improved coal mining apparatus of the lowvein, mounted type is provided wherein horizontal kerfs may be cut in a mine wall at various elevations in an improved manner. It will further be evident that by the provision of the improved adjustable supporting structure for the kerf cutter, horizontal kerfs may be cut at the level of the mine floor outside and below the level of the mine trackway or at different elevations above the floor level. It will further be evident that by the provision of the improved swinging and tilting mechanism for the kerf cutter, it is possible to move the latter into different cutting positions in an extremely flexible manner. It will also be noted that by the provision of the hydraulically operated adjusting and moving means for the kerf cutter, it is possible to move the latter at the desired speed under perfect control and to maintain the kerf cutter in its adjusted position. By the provision of the improved valve mechanism and manifold, it is possible to lead the various liquid conduits to the various hydraulically operated devices in an extremely vertically compact manner, thereby to attain relatively low height. Other uses and advantages of the improved coal mining apparatus will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a mining apparatus, the combination comprising a support, an arm supporting frame pivotally mounted on said support to rock relative thereto on an axis extending longitudinally of the apparatus, a cutter supporting arm structure pivotally mounted on said pivoted supporting frame to swing in vertical planes relative thereto and projecting forwardly therefrom, a horizontal kerf cutter carried by said pivoted arm structure, means for swinging said arm structure on its pivotal mounting to vary the elevation of said kerf cutter, guide brackets at the sides of said support and providing guideways for receiving lateral guides on the opposite sides of said pivoted supporting frame, fluid cylinders carried by said brackets and containing pistons, lateral lugs on said pivoted supporting frame at the sides of said arm structure with which said pistons respectively engage, means for controlling liquid flow with respect to said cylinders to effect movement of said pistons to rock said pivoted supporting frame on its pivotal axis to change the angular position of said arm structure and said kerf cutter, a motor on said support rearwardly of said pivoted supporting frame, and transmission connections driven by said motor and extending generally longitudinally of said arm structure for driving said kerf cutter, said connections lying midway between said fluid cylinders.

2. In a mining apparatus, the combination comprising a support, an arm supporting frame pivotally mounted on said support to rock on an axis extending longitudinally of the apparatus, a cutter supporting arm structure pivotally mounted on said pivoted supporting frame and projecting forwardly therefrom, a horizontal kerf cutter carried by the outer portion of said pivoted arm structure, means for swinging said arm structure about its pivotal mounting to vary the elevation of said kerf cutter, guiding means at the sides of said support engaging guideways on the opposite sides of said pivoted supporting frame for guiding the latter during its rocking movement, fluid operated devices carried by said support at the outer sides of said arm structure and operatively engaging said pivoted supporting frame to rock the latter relative to said support to change the angular position of said arm structure to tilt said kerf cutter, a motor on said support rearwardly of said pivoted supporting frame, and transmission connections driven by said motor and extending generally longitudinally of said arm structure for driving said kerf cutter, said connections lying midway between said fluid operated devices.

3. In a mining apparatus, the combination comprising a support, an arm supporting frame pivotally mounted on said support to rock relative thereto about an axis extending longitudinally of the apparatus, parallel arms pivotally mounted on said supporting frame to swing relative thereto on parallel pivots, a horizontal kerf cutter supported by said arms, means for swinging said arms on their pivotal mounting to vary the elevation of said kerf cutter, extensible power operated tilting devices mounted on said support at the rear ends of said arms and arranged at the outer sides of said arms laterally of said arm pivots and operatively connected between said support and said pivoted frame for rocking the latter on its pivot, said tilting devices and said arm pivot axes being so arranged that a transverse vertical plane in which the arm pivot axes lie cuts through said tilting devices, a motor on said support rearwardly of said pivoted supporting frame, and transmission connections driven by said motor and extending generally longitudinally of said arm structure for driving said kerf cutter, said connections lying midway between said tilting devices.

4. In a mining apparatus, the combination comprising a base, a horizontal frame pivotally mounted on said base to swing horizontally relative thereto about a vertical axis and having a forward transversely extending, vertical support portion, a transverse vertically disposed member secured to said support portion and having laterally projecting portions, a support carried by said transverse support portion and pivotally mounted to rock about a longitudinal axis extending in a direction radial to the pivotal axis of said horizontal frame, a supporting structure adjustably mounted on said pivoted support to rock with the latter and to swing in vertical planes relative thereto, said supporting structure extending forwardly in advance of said pivoted support, a kerf cutting mechanism carried by said adjustable supporting structure at the outer portion thereof, said transverse member having brackets carried by the laterally projecting portions thereof at the sides of said base, means for swinging said horizontal frame about its pivot comprising horizontal fluid cylinders pivotally mounted on said brackets respectively to swing in horizontal planes and pistons reciprocable in said cylinders respectively and having rearwardly extending piston rods pivotally connected to the sides of said base, and means for tilting said pivoted support comprising vertical fluid cylinders carried by said transverse member and respectively containing pistons, and projections at the sides of said pivoted support with which said pistons respectively engage, said vertical fluid cylinders being arranged on said transverse member in laterally spaced relation intermediate said adjustable supporting structure and said horizontal fluid cylinders at the inner sides of the latter, said projections extending laterally from the sides of said adjustable supporting structure beneath said vertical cylinders.

References Cited in the file of this patent

UNITED STATES PATENTS

| Number | Name | Date |
|---|---|---|
| 755,238 | Peake et al. | Mar. 22, 1904 |
| 1,337,048 | Deans et al. | Apr. 13, 1920 |
| 1,737,045 | Davis | Nov. 26, 1929 |
| 1,904,488 | Levin | Apr. 18, 1933 |
| 1,946,634 | Muller | Feb. 13, 1934 |
| 2,062,657 | Joy | Dec. 1, 1936 |
| 2,075,954 | Osgood | Apr. 6, 1937 |
| 2,100,336 | Joy | Nov. 30, 1937 |
| 2,131,175 | Holmes | Sept. 27, 1938 |
| 2,224,872 | Joy | Dec. 17, 1940 |
| 2,261,162 | Joy | Nov. 4, 1941 |
| 2,263,779 | Jeffrey | Nov. 25, 1941 |
| 2,310,314 | Pray | Feb. 9, 1943 |
| 2,327,928 | Osgood | Aug. 24, 1943 |
| 2,334,772 | Jeffrey | Nov. 23, 1943 |
| 2,357,724 | Beltz | Sept. 5, 1944 |
| 2,365,387 | Briscoe | Dec. 19, 1944 |
| 2,381,425 | Deal | Aug. 7, 1945 |
| 2,395,302 | Glomer | Feb. 19, 1946 |
| 2,559,711 | Dansereau | July 10, 1951 |